W. E. BOCK.
STABILIZING MECHANISM FOR VEHICLE RUNNING GEAR.
APPLICATION FILED JULY 11, 1913.
1,138,183.
Patented May 4, 1915.
2 SHEETS—SHEET 1.
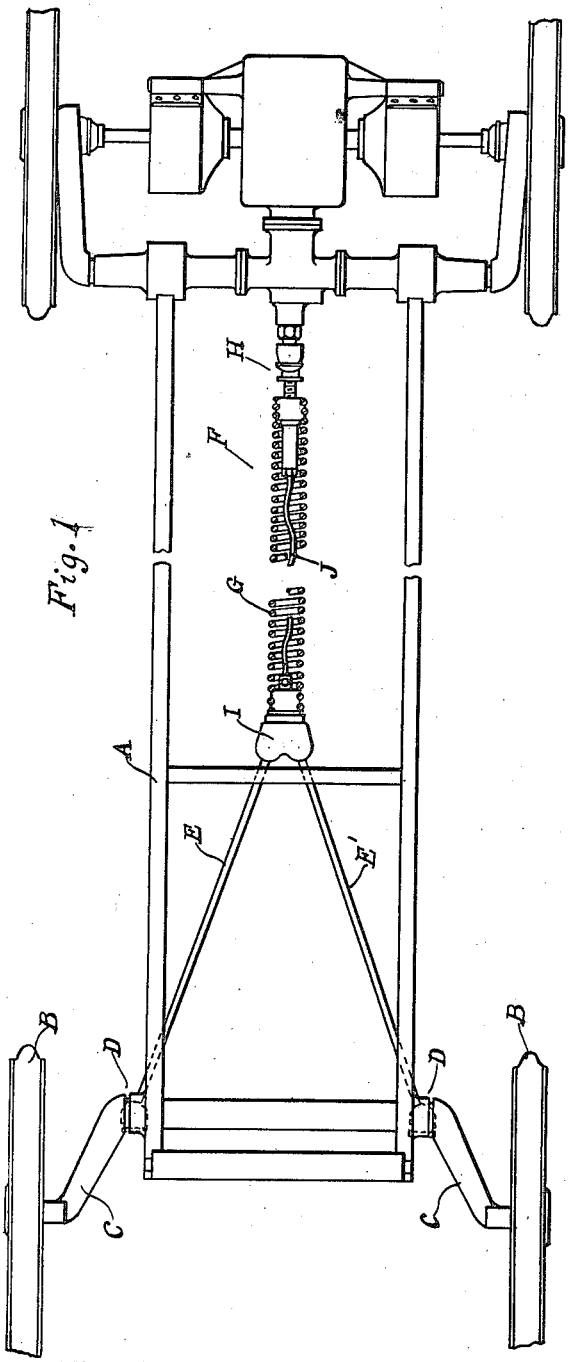
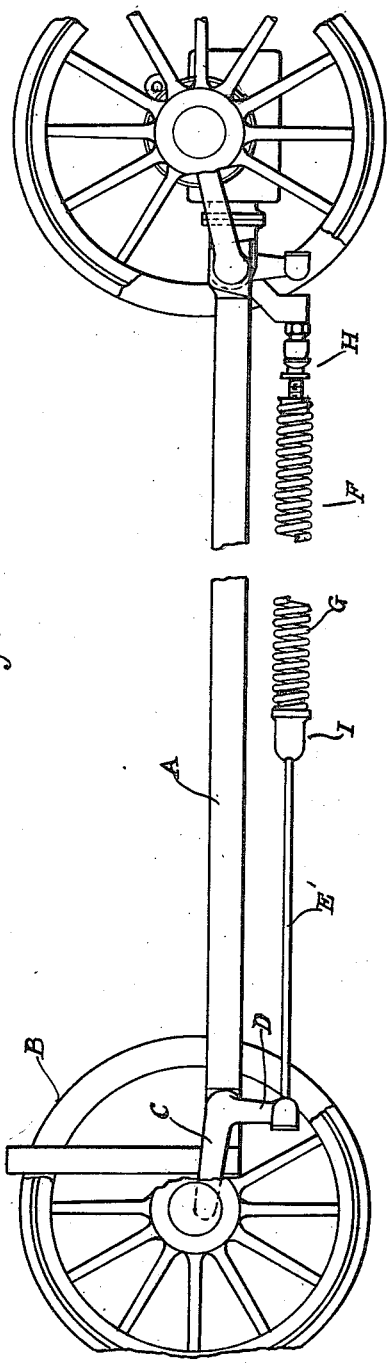
WITNESSES
James P. Barry.
W. K. Ford
INVENTOR
William Emil Bock
BY
Whittemore Hulbert & Whittemore
ATTORNEYS

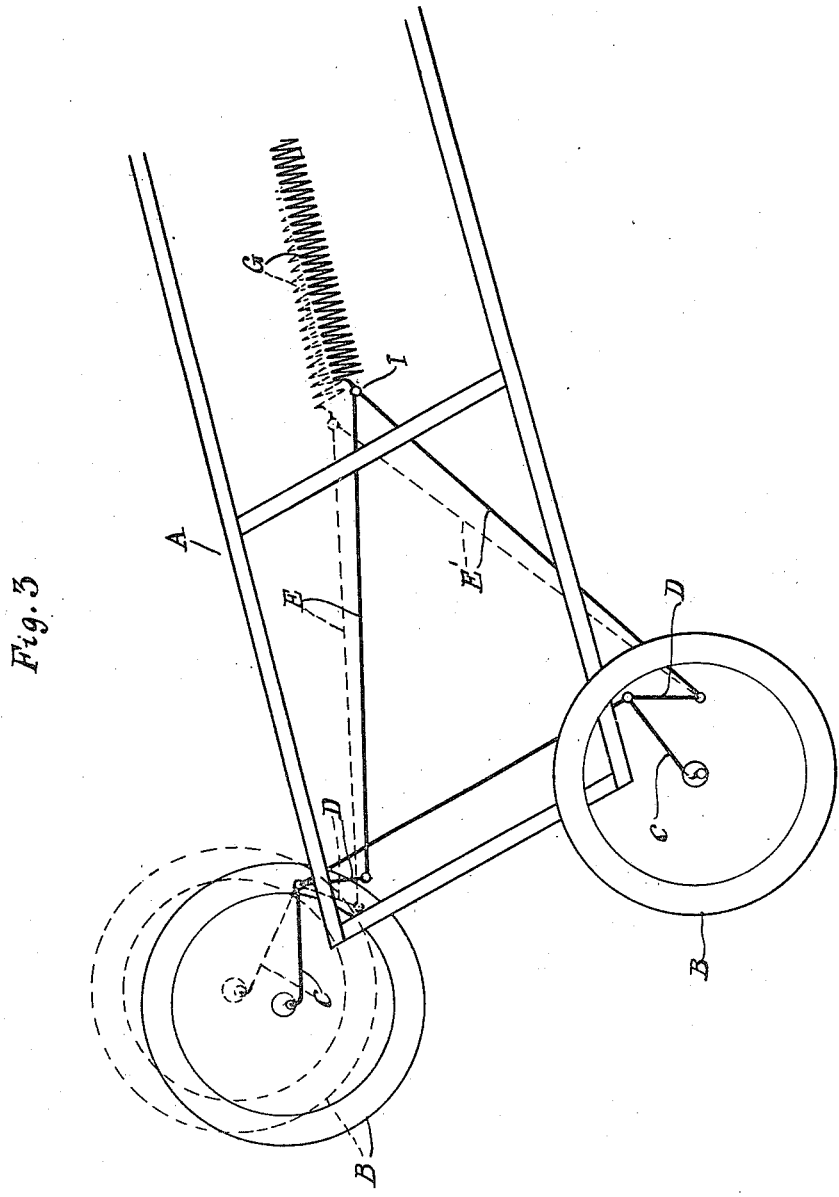

UNITED STATES PATENT OFFICE.

WILLIAM EMIL BOCK, OF TOLEDO, OHIO.

STABILIZING MECHANISM FOR VEHICLE RUNNING-GEAR.

1,138,183.  Specification of Letters Patent.  Patented May 4, 1915.

Application filed July 11, 1913. Serial No. 778,493.

*To all whom it may concern:*

Be it known that I, WILLIAM EMIL BOCK, a citizen of the United States of America, residing at Toledo, in the county of Lucas and State of Ohio, have invented certain new and useful Improvements in Stabilizing Mechanism for Vehicle Running-Gear, of which the following is a specification, reference being had therein to the accompanying drawings.

The invention relates to vehicles of that type in which the frame is supported upon wheels upon opposite sides thereof, having separate independently-yieldable axles.

It is the object of the invention to provide means which, while permitting independent movement of said wheels, nevertheless tends to restore the same to normal position when unequally deflected.

In the drawings: Figure 1 is a plan view of the vehicle to which my improvement is applied; Fig. 2 is a side elevation thereof; Fig. 3 is a diagrammatic perspective view showing in full and dotted lines the position of parts in normal and deflected positions.

A is the vehicle frame, B are the wheels upon opposite sides of said frame, and C are independently-movable rock arms forming yieldable connections between said wheels and frame. Each of these rock arms is provided with a bell crank arm D, which is connected to a spring or other resilient member.

With the arrangement just described the frame will be resiliently supported upon the wheels and will permit of independent vertical movement of the latter, but the construction would be lacking in stability due to the fact that any shifting of the load would tend to depress one of said yielding members more than the other, leaving the frame in tilted position.

My improved stabilizer comprises a connection between the bell crank arms D by which the load sustained by one of said arms reacts also upon the other arm and differentially in different positions of adjustment. Thus where the wheels are in axial alinement and the load is centrally disposed upon the frame, the reaction through the stabilizing connection will be equal, but where one of the wheels is depressed more than the other or the load is unequally distributed on the frame, this will increase the power of one of the bell crank arms relative to that of the other, so as to tend to restore the parts to normal position.

As shown, my improved stabilizer comprises a pair of links E and E', which are connected at one end to the respective bell crank arms D and extend therefrom to a point of convergence, where they are pivotally attached to each other. They are also connected to a link F which, in normal position of parts, has its axis at equal angles to the two links E and E' and its opposite end anchored to the frame. This link F is preferably a resilient link formed by the spring G, which is attached at one end to a pivotal anchor link H and at its opposite end to the member I connected to the links E and E'. There is also preferably a cable or other supplemental connection J extending within the spring G, which will permit yielding of the latter but in case of breakage will limit the movement.

With the construction just described, the tension of the spring G will normally react equally upon the links E and E' and upon the bell crank levers D and arms C connected therewith. This will yieldably support the frame upon the wheels B where the load is uniformly distributed. Should there be a shifting of the center of gravity which throws a greater load upon one of the arms C, this will cause a movement of the latter and its corresponding bell crank levers D, which in turn will draw upon the links E and E' connected therewith with increased power. This will deflect the link F from its median position so as to be more nearly in alinement with the link E sustaining the increased load, and therefore react with greater power thereupon. At the same time, this deflection of the link F will increase the angle between the same and the opposite link E', thereby decreasing the power of the reaction upon the latter. It will be understood that the change in leverage just described will also occur where the load is equally distributed, but where one of the wheels B is raised or depressed more than the other. Therefore, if the vehicle is traveling over a rough road, the wheels are free to rise and fall independently of each other, but when out of alinement the unequal reaction of the spring thereupon will tend to restore them to normal position. Thus with a very simple and inexpensive construction of linkage the vehicle is effectively stabilized.

What I claim as my invention is:

1. In a vehicle, the combination with the frame, of wheels on opposite sides of said frame independently yieldable in relation thereto, a bell crank lever actuated by the depression of each wheel, angling links connected to said bell crank levers and to each other, and a link connected to said angling links normally in median position to be laterally deflected by an unequal movement of said bell crank lever.

2. In a vehicle, the combination with the frame, of wheels upon opposite sides of said frame, rock arms upon said frame having their free ends connected to said wheels, bell crank arms for said rock arms, a link anchored to said frame and extending longitudinally thereof in a central position, and angling links connected to said longitudinal link and respectively to said bell crank arms.

3. In a vehicle, the combination with a frame, of wheels arranged upon opposite sides of said frame, rock arms on said frame having their free ends supported upon said wheels, bell crank arms for said rock arms, a resilient yieldable member extending longitudinally of said frame centrally thereof, and angling links connecting said resilient member respectively to said bell crank arms.

4. In a vehicle, the combination with a frame, of wheels upon opposite sides of said frame, rock arms connected with said frame having their free ends supported on said wheels, bell crank arms for said rock arms, a resilient member anchored to said frame and extending longitudinally and centrally thereof, angling links connected with the free end of said resilient member and respectively to said bell crank arms, and means for limiting the yielding of said resilient member.

5. In a vehicle, the combination with a frame, of wheels upon opposite sides thereof, rock arms on said frame having their free ends supported on said wheels, bell crank arms for said rock arms, a resilient link anchored to said frame and extending longitudinally and centrally thereof, angling links connecting the free end of said resilient link to the respective bell crank arms, and a cable connecting opposite ends of said resilient link for limiting the yielding movement thereof.

6. In a vehicle, the combination with a frame, of wheels upon opposite sides of said frame, rockable members for supporting said frame upon said wheels, bell crank arms for said rockable members, links connected to said bell crank arms extending to a point of convergence, a member pivotally connected to said links, a resilient member connected to said pivotal member, and an anchor for said resilient member connected to said frame.

7. In a vehicle, the combination with a frame, of wheels upon opposite sides of said frame independently yieldable in relation thereto, a lever actuated by the depression of each wheel, a yieldable link anchored to said frame and extending longitudinally thereof in central position, and connections between said link and levers, said yieldable link being adapted to be laterally deflected by an unequal movement of said levers.

In testimony whereof I affix my signature in presence of two witnesses.

WILLIAM EMIL BOCK.

Witnesses:
H. L. BOCK,
W. E. CRABBS.